Figure 9:
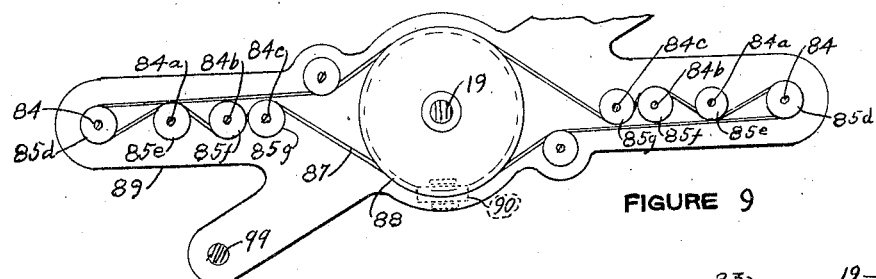

A. REYNOLDS.
FISH CLEANING MACHINE.
APPLICATION FILED MAY 1, 1920.

1,362,510.

Patented Dec. 14, 1920.
4 SHEETS—SHEET 1.

INVENTOR
Albert Reynolds
BY John A. Naismith
ATTORNEY

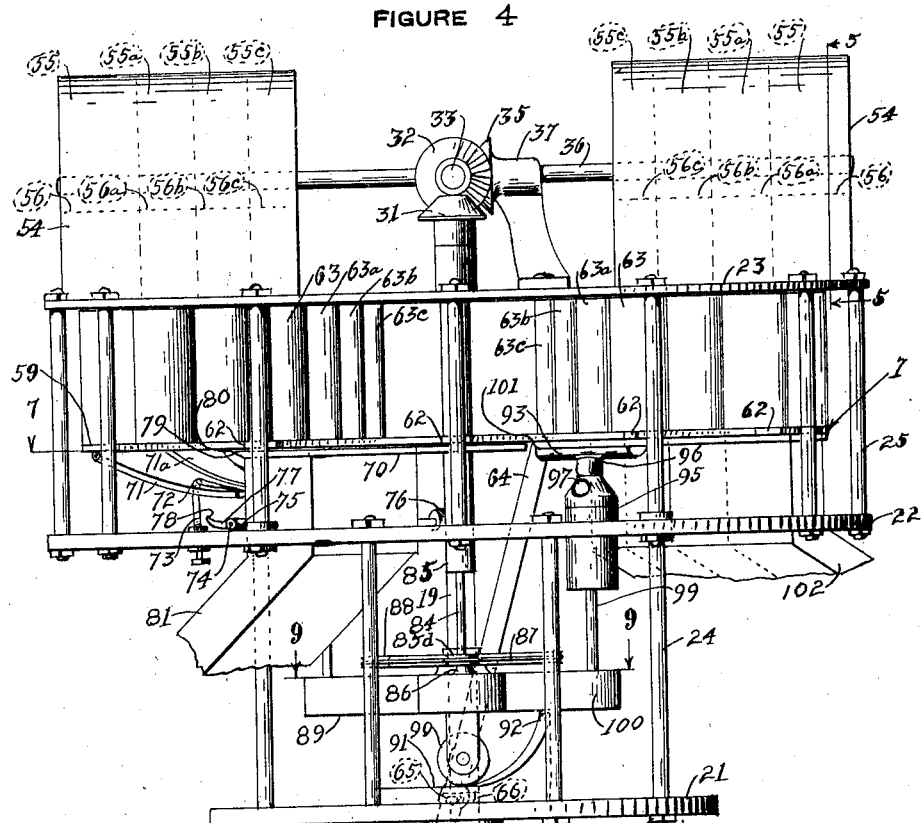
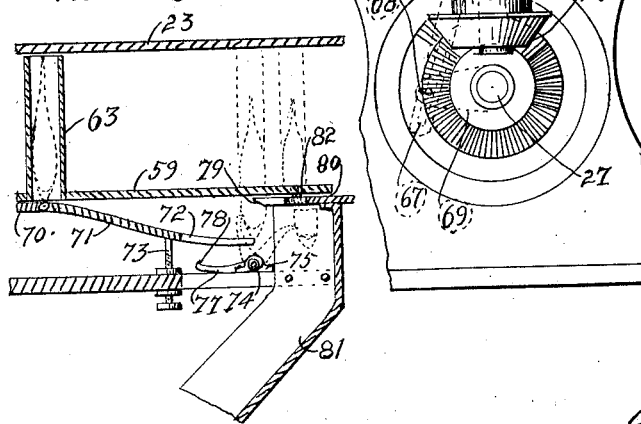
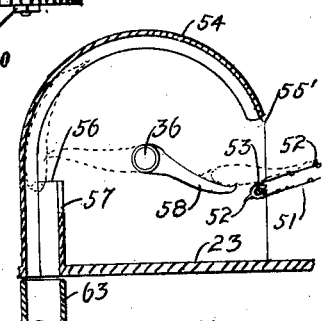

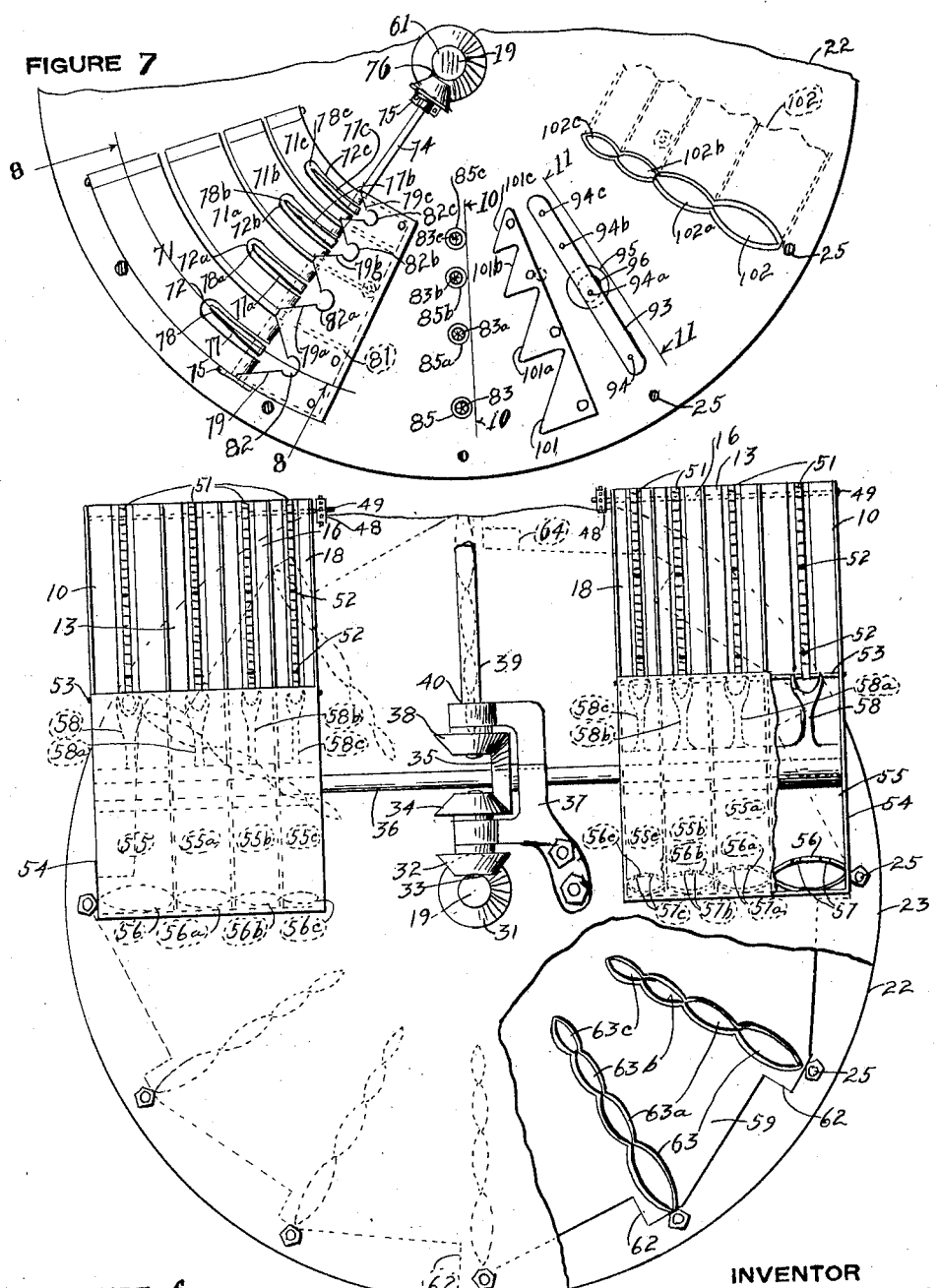

A. REYNOLDS.
FISH CLEANING MACHINE.
APPLICATION FILED MAY 1, 1920.

1,362,510.

Patented Dec. 14, 1920.
4 SHEETS—SHEET 4.

INVENTOR
Albert Reynolds
BY John A. Naismith
ATTORNEY

UNITED STATES PATENT OFFICE.

ALBERT REYNOLDS, OF SAN JOSE, CALIFORNIA.

FISH-CLEANING MACHINE.

1,362,510.     Specification of Letters Patent.     Patented Dec. 14, 1920.

Application filed May 1, 1920. Serial No. 378,197.

*To all whom it may concern:*

Be it known that I, ALBERT REYNOLDS, a subject of the King of Great Britain, and residing at San Jose, in the county of Santa Clara and State of California, have invented certain new and useful Improvements in Fish-Cleaning Machines, of which the following is a specification.

My invention relates particularly to a machine for beheading and cleaning small fish, and it is the object of my invention to provide a machine of the character indicated that will receive a whole fish and behead and thoroughly clean the same ready for canning or other disposal. I also contemplate providing certain novel devices for handling and operating upon the fish during the cleaning process.

In the drawing:—

Figures 10, 11:
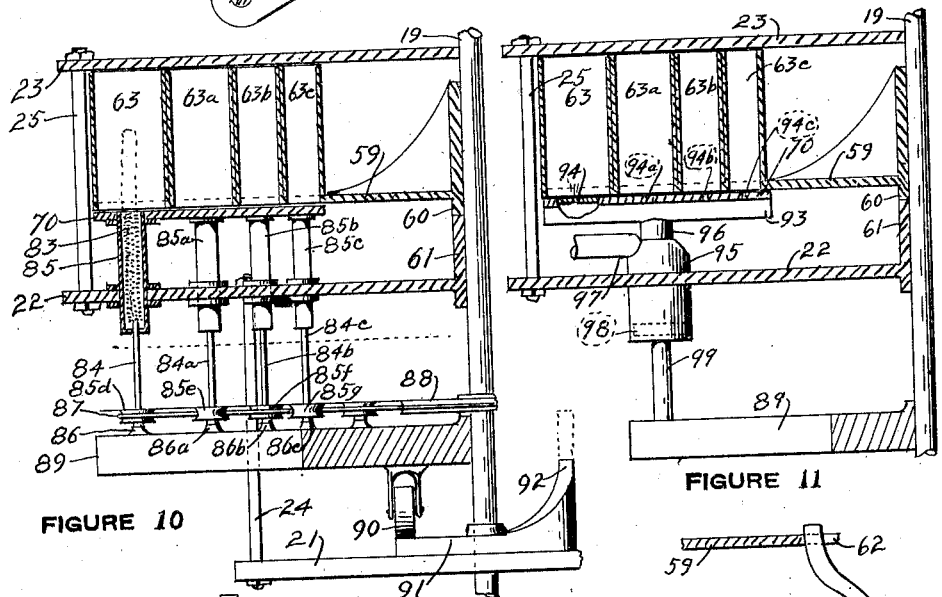
Figures 12, 13:
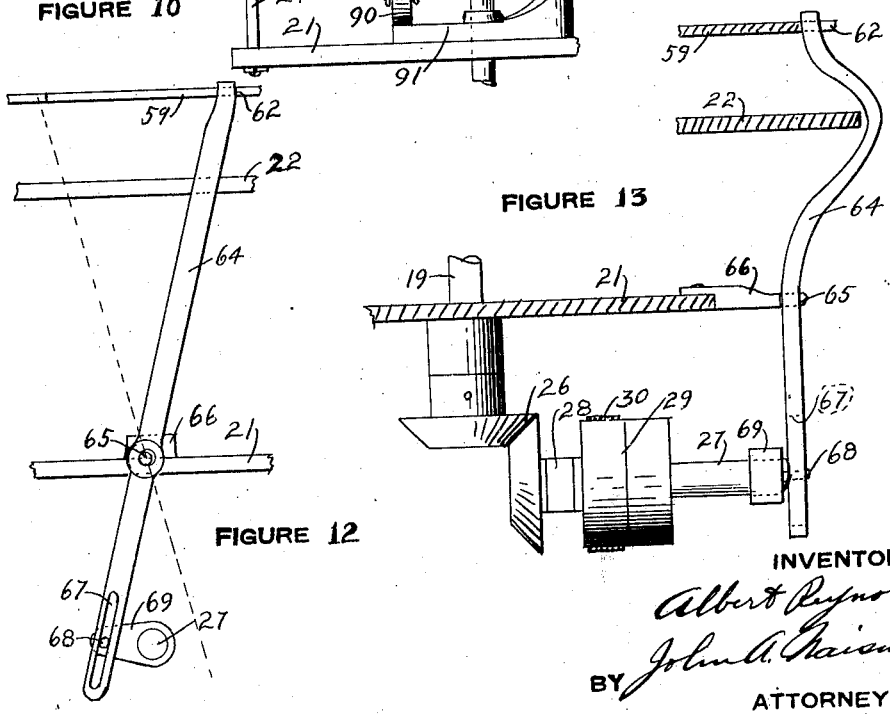

Figure 1 is a plan view of the machine. Fig. 2 is a side elevation of the same, parts being broken away. Fig. 3 is a section on 3—3 of Fig. 2. Fig. 4 is an enlarged front elevation of the machine, parts being broken away. Fig. 5 is a section on 5—5 of Fig. 4. Fig. 6 is a plan view of that part of the machine shown in Fig. 4, part being broken away. Fig. 7 is a plan view on line 7—7 of Fig. 4. Fig. 8 is a section on 8—8 of Fig. 7. Fig. 9 is a sectional view on 9—9 of Fig. 4, parts being broken away. Fig. 10 is a section on 10—10 of Fig. 7. Fig. 11 is a section on 11—11 of Fig. 4. Fig. 12 is an elevation of the ratchet operating mechanism. Fig. 13 is a side elevation of the ratchet operating mechanism shown in Fig. 12, with connection to driving shaft. Fig. 14 is a detail elevation of the shaking mechanism. Fig. 15 is a section on 15—15 of Fig. 1. Fig. 16 is a section on 16—16 of Fig. 1.

Referring now more particularly to the drawing, 1 is a framework upon which is mounted a stationary hopper 2 provided with the door 3 operated by handle 4. At 5 is shown a frame mounted on frame 1 by flexible supporting arms 6 so that a shaking movement may be imparted thereto. At 7 is a screen mounted in frame 5 to receive fish from hopper 2 and discharging into the uppermost part of the grader as 8 through the slots 9 of which the smaller fish fall, the larger fish moving forward down the inclined chute 10 to be removed as herinafter described. The fish falling through slots 9 fall upon grader portion 11, the smaller sizes falling through slots 12 and the larger fish moving down chute 13. The fish falling through slots 12 are similarly sorted on grader portion 14 provided with slots 15 and chute 16, the smallest fish being caught by bottom portion 17 and directed down chute 18.

It is desirable that all of the fish be deposited in a given chute, as 56, with their backs turned in the same direction in order to more accurately and efficiently behead and clean them. To effect this result I provide a short section of the chute 10 with a reservoir $10^a$ into which water is supplied from pipe $10^b$ and out of which it flows at point $10^c$. The fish passing into the reservoir from chute 10 immediately turn upon their backs and are carried forward to the point $10^c$ where the water is discharged and where the chute is formed with steeply inclined side walls as shown in Fig. 15. The side walls of the chute gradually twist until at a point as $10^d$ the fish are lying on their sides and discharged into the end $10^e$ of the chute lying in that position. It is evident that by this method all of the fish discharged from chute 10 will be delivered to the end $10^e$ thereof with their backs turned in the same direction.

At 19 is a vertical shaft mounted in standard 20 carrying three horizontal circular plates 21—22—23 respectively, spaced by bolts 24—25 respectively. Shaft 19 is driven by a gear connection 26 to drive shaft 27 supported in bearings 28 and carrying drive pulley 29 operated by belt 30 from a source of power not shown. The upper end of shaft 19 is provided with a bevel gear 31 meshing with gear 32 on shaft 33 which also carries gear 34 meshing with gear 35 on shaft 36 supported by bearings 37. A second gear 38 meshes with gear 35 and operates shaft 39 in bearings 40 and which in turn meshes with a gear 41 on shaft 42, the latter being mounted in bearings 43 and driving eccentrics 44 mounted on each end thereof, each eccentric being connected to frames 5 by rods 45 thereby imparting a shaking movement thereto when rotated. Shaft 42 also carries sprockets 46 which are connected by chains 47 to sprockets 48 on shafts 49, said shaft being mounted on bracket 50 mounted on plate 23. Shafts 49 each carry a plurality of feeding chains 51 provided with spacing elements 52 and mounted on shafts 53 on plate 23, a chain being positioned in alinement with the center line of each chute 10—13—16 and 18.

The mechanism for receiving fish from the grader and operating upon and discharging the same is as follows.

Upon plate 23 in alinement with each grader is positioned a hood 54 through which shaft 36 passes, the hood being provided with an opening at 55′ to receive the delivering end of chains 51 and divided into several compartments as 55—55$^a$—55$^b$—55$^c$ to correspond with the four grades of fish to be beheaded and cleaned. Opposite each opening is positioned a chute as at 56—56$^a$—56$^b$—56$^c$ having vertical slots therein as at 57—57$^a$—57$^b$—57$^c$ and discharge openings in their lower ends in plate 23. Mounted upon shaft 36, and in each compartment, is an arm as at 58—58$^a$—58$^b$—58$^c$ provided with a forked end terminating in hooked ends as shown. The mechanism for revolving shaft 36 is so timed that as chain 51 delivers a single fish through opening 55 it is caught under the gills by one of the hooked arms and carried around under hood 54, which supports its outer side, and is dropped head first into the chute with which it coöperates, the hooked end passing out through the slots in the chute thereby assuring a free delivery of the fish.

At 59 is shown a horizontal plate of less diameter than plate 23 and mounted to revolve within supporting bolts 25 by having a bearing 60 resting upon hub 61 on plate 22, and provided with teeth 62 on its outer edge as shown. Radially arranged on plate 59 and equally spaced thereon are holders 63—63$^a$—63$^b$—63$^c$, each holder extending up closely to the under side of plate 23 and being open at its lower end and extending through plate 59. These holders are equal in number to teeth 62 so that as plate 59 is revolved by the ratchet mechanism hereinafter described one row of holders 63 to 63$^c$ is moved into position in alinement with chutes 56 to 56$^c$ and remains there while the ratchet mechanism moves back to the next tooth, during which time a fish is dropped into each holder by arms 38 to 38$^c$ operating as shown.

The ratchet mechanism referred to consists of an arm 64 engaging teeth 62 and pivoted at 65 on bearing 66 mounted on plate 21, its lower end being provided with a slot 67 engaging a pin 68 eccentrically positioned on crank 69 mounted on shaft 27. The arm 64 is bowed around plate 22 and is provided with sufficient spring to cause it to readily engage each tooth in succession.

At 70, most clearly shown in Figs. 8–10 and 11, is provided a fixed plate immediately below plate 59 carrying the holders described and supported by the devices hereinafter described and referred to as the cutter and cleaner, brusher, trimmer, washer and discharge chute. As in the grader there are two sets of grading mechanisms, so in this part of the machine there are two sets of the devices named. To simplify the description but one series of elements of one set is described in detail.

Curving downwardly from plate 70 and in the path of travel of holders 63 is a guide 71 provided with a terminal slot 72 and adjustable as to height by a screw 73 set in plate 22. At 74 is shown a shaft mounted in bearings 75 on plate 22 and operated by a gear connection to shaft 19 as at 76. Upon shaft 74 is an arm 77 terminating in a hook 78 and revolved through slot 72. At 79 is shown a forked knife edge substantially parallel with plate 59 and positioned slightly below the same as at 80 in the relative position to arm 77 shown and supported on chute 81 which is in turn secured to plate 22. The forked knife edge 79 terminates in a substantially circular opening 82 which is not provided with a cutting edge but is of such a size as to permit the entrails of the fish to pass therethrough when the head is removed.

Spaced from knife 79 a distance equal to the spacing of holders 63 is a brushing device 83 mounted on spindle 84 and within tube 85, the latter being fixedly mounted in plates 22 and 70 and open at its upper end. Spindle 84 is mounted on pulley 85$^d$ on bearing 86 and is revolved by a cable 87 operated by a large pulley 88 on shaft 19. The pulley and bearing are mounted upon a vertically movable member 89 in which shaft 19 freely revolves and which is raised at stated intervals by means of a roller 90 mounted on the under side thereof and operating on a cam track 91 secured to shaft 19. When roller 90 rides over elevation 92 of cam track 91 it raises brushes 83 into the holder positioned thereabove and then withdraws the brush into tube 85 as roller 90 returns to the low portion of track 91.

Spaced from brush 83 a distance equal to the spacing of holders 63 is a washing device consisting of a tube 93 provided with an orifice 94 extending through plate 70 and having a pump 95 communicating therewith as at 96. Pump 95 has a water inlet at 97 and a piston 98 operated by rod 99 mounted on arm 100 on member 89 so that water is ejected through orifice 94 under pressure at the same time that brush 83 is raised into position for cleaning.

At 101 is shown an angular trimming knife edge mounted on plate 70 in close relation to plate 59 so as to trim off the end of the fish after brushing and before washing.

At 102 is shown a discharge chute mounted in plates 22 and 70 and spaced from washer 93 a distance equal to the spacing of holders 63 so that the cleaned fish is discharged at the time the plate 70 is stationary for the brushing and washing processes.

When this device is in operation the fish, particularly sardines for the particular type of machine herein described, are dumped into hopper 2 and gradually fed out upon screens 7 by manipulating doors 3. The shaking of frame 5 spreads the fish out on the screen and moves them forward, head foremost, into the grader where they are sorted as to size and moved down the several chutes to the carrier chains 51, four upon each side of the machine or eight in all. These chains 51 and arms 58 to 58$^c$ are so timed that each fish brought forward by a chain is caught up by an arm and swung around and dropped head first into a chute 56 to 56$^c$ and thence into a holder 63 to 63$^c$, the several parts of the machine being timed so that eight fish are dropped into holders at the same time that eight cleaned fish are discharged from the holders, there being 32 fish in varying stages of cleaning at all times. The fish positioned in holders 63 to 63$^c$ are moved around one-twelfth of a revolution upon each operation of ratchet arm 64.

The first movement carries the fish onto guides 71 to 71$^c$ down which they move, partially dropping out of their guides by gravity.

The second movement carries them past the guides and part way through the knives 79 to 79$^c$ to a point where they are practically in vertical alinement with openings 82 to 82$^c$. As they reach this position hooks 77 to 77$^c$ engage the heads of the fish, tear them loose and drop them into chutes 81 to 81$^c$. The circular openings 82 to 82$^c$ permit the removal of the fish head to draw with it the entrails of the fish so as to have it a practically clean carcass.

The third movement carries the fish to points in vertical alinement with brushes 83 to 83$^c$. As soon as they reach this position wheel 90 rides up on cam surface 92 thereby causing the revolving brushes to be forced up into the interior of the fish and effectually brushing out and cleaning the interior of the fish. the brushes being withdrawn as described before the next movement takes place.

The fourth movement carries the fish past knives 101 to 101$^c$, which trim off the ragged ends of the fish left by the head removing process, to points in vertical alinement with orifices 94 to 94$^c$. At the moment they take this position the upward movement of piston 98 causes small streams of clear water to be injected into the interior of each fish thereby thoroughly cleansing the same.

The fifth movement carries the fish to points over discharge outlets 102 to 102$^c$ where they are dropped out of their respective tubes or holders and are carried away for packing or distribution.

The sixth movement carries the empty tubes or holders to points in vertical alinement with chutes 57 to 57$^c$ where a fish is again deposited in each tube and the tubes or holders moved around through six more stages to complete a full revolution, each complete revolution performing the receiving, cleaning and discharging operations twice.

It is understood of course that changes in construction and operation and combinations of coöperating devices may be made within the scope of the appended claims.

I claim:—

1. A fish cleaning machine including an open ended tubular fish holder operatively mounted to travel in an annular path, devices for depositing a fish in said holder head foremost, means for retaining the fish in said holder during a portion of its revolution, means for permitting the ejection of the fish from said holder a predetermined distance at a given point in its revolution, and devices located in the path of travel of said holder and the fish therein for successively beheading the fish and removing the entrails therefrom, brushing out the interior of the fish, washing out the interior of the fish, and receiving the cleaned fish, and means for operating the several devices in coordinate relation with each other.

2. A fish cleaning machine including an open ended tubular fish holder operatively mounted to travel in an annular path, devices for depositing a fish in said holder head foremost, means for retaining the fish in said holder during a portion of its revolution, means for permitting the ejection of the fish from said holder a predetermined distance at a given point in its revolution, and devices located in the path of travel of said holder and the fish therein for beheading and removing the entrails from the fish, and receiving the cleaned fish, and means for operating the several devices in coördinate relation with each other.

3. A fish cleaning machine including an open ended tubular fish holder operatively mounted to travel in an annular path, devices for depositing a fish in said holder head foremost, means for retaining the fish in said holder during a portion of its revolution, means for permitting the ejection of the fish from said holder a predetermined distance at a given point in its revolution, and devices located in the path of travel of said holder and the fish therein for beheading the fish and removing the entrails therefrom, brushing out the interior of the fish, and receiving the cleaned fish, and means for operating the several devices in coordinate relation with each other.

4. A fish cleaning machine including an open ended tubular fish holder operatively mounted to travel in an annular path, devices for depositing a fish in said holder head foremost, means for retaining the fish in said holder during a portion of its revolution, means for permitting the ejection of the fish from said holder a predetermined distance at a given point in its revolution, and devices located in the path of travel of said holder and the fish therein for beheading the fish and removing the entrails therefrom, brushing out the interior of the fish, trimming the cut end of the fish, and receiving the cleaned fish, and means for operating the several devices in coördinate relation with each other.

5. A fish cleaning machine including an open ended tubular fish holder operatively mounted to travel in an annular path, devices for depositing a fish in said holder head foremost, means for retaining the fish in said holder during a portion of its revolution, means for permitting the ejection of the fish from said holder a predetermined distance at a given point in its revolution, and devices located in the path of travel of said holder and the fish therein for beheading the fish and removing the entrails therefrom, brushing out the interior of the fish, trimming the cut end of the fish, washing out the interior of the fish, and receiving the cleaned fish, and means for operating the several devices in coördinate relation with each other.

6. In combination, a fish spreader and positioner, a grader, feeding devices for the graded fish, a fish holder, means for transferring the individual fish from the feeding devices to said holder at fixed intervals, mechanism for revolving said holder and the fish therein about a given center, devices for beheading and cleaning the fish located at fixed intervals in the path of travel of said holder, means for discharging the cleaned fish from the holder, and means for operating the several parts and devices in coördinate relation with each other.

7. A fish cleaning machine including an open ended tubular fish holder operatively mounted to travel in an annular path, mechanism for imparting an intermittent movement to said holder, devices for depositing a fish in said holder head foremost at a given point in its point of travel, means for retaining the fish in said holder during a portion of its revolution, means for permitting the ejection of the fish from said holder a predetermined distance at a given point in its revolution, and devices located in the path of travel of said holder and the fish therein for beheading and removing the entrails from the fish, and receiving the cleaned fish, and means for operating the several devices in coördinate relation with each other.

8. A transferring device for fish cleaning machines comprising a feeding device, a receiving chute and an arm having a fish engaging extremity operatively mounted to revolve between said feeding device and said chute and proportioned to engage a fish on said feeding device and transfer it to said chute.

9. A transferring device for fish cleaning machines comprising a feeding device, a receiving chute, a circular hood extending from the one to the other, and an arm having a fish engaging extremity operatively mounted to revolve within said hood and between said feeding device and said chute and proportioned to engage a fish on said feeding device, maintain the same in contact with said hood during the transfer process and discharge the same into said chute.

10. In a transferring device for fish cleaning machines, the combination with a feeding device and a receiving chute of a fish transferring member operatively mounted to rotate between said feeding device and chute and comprising an arm having its extremity formed into a forked hook adapted to engage the gills of a fish presented thereto by said feeding device.

11. In a fish cleaning machine a stationary plate, a fish holder operatively mounted to rotate thereover, a guide mounted thereon below the path of travel of said holder, and a knife mounted thereon below the path of travel of said holder and adjacent thereto and adjacent the end of said guide, said knife being provided with inwardly converging cutting edges terminating in a central opening provided with a blunt edge.

12. The combination with fish holding and positioning mechanisms of a knife located in the path of travel of said fish holder and presenting a pair of converging cutting edges thereto and provided with a blunt edged recess communicating with said cutting edges.

13. The combination with fish holding and positioning mechanisms of a knife located in the path of travel of said fish holder and presenting a pair of converging cutting edges thereto and provided with a blunt edged recess communicating with said cutting edges, and means operatively mounted adjacent said knife for removing the head from the fish cut thereby and withdrawing the entrails of the fish through said recess.

14. The combination with fish holding devices and positioning mechanisms, of a knife located in the path of travel of said fish holder and presenting a pair of converging cutting edges thereto and provided with a blunt edged recess communicating with said cutting edges, means for momentarily stopping said holding devices over said recess, and means operatively mounted adjacent said knife for removing the head from the fish cut thereby and withdrawing the entrails of the fish through said recess.

15. The combination with fish holding and positioning mechanisms of a knife located in the path of travel of said fish holder and presenting a pair of converging cutting edges thereto, and an arm operatively mounted to revolve adjacent said knife and provided with a terminal hook adapted to engage the gills of a fish cut by said knife whereby to remove the head therefrom.

16. The combination with fish holding and positioning mechanisms of means for imparting an intermittent movement to said holder and a brush revolubly mounted adjacent said holder and operatively mounted to be advanced into and withdrawn from said holder when not in motion.

17. The combination with fish holding and positioning mechanisms of means for imparting an intermittent movement to said holder, a brush revolubly mounted in axial alinement with said holder when positioned thereabove, means for advancing said brush into the holder and withdrawing the same from said holder during one stop of said holder, and means for injecting a stream of water into said holder during the next succeeding stop of the said holder.

18. The combination with fish holding and positioning mechanisms of means for imparting an intermittent movement to said holder, a brush revolubly mounted in axial alinement with said holder when positioned thereabove, means for advancing the brush into the holder and withdrawing the same from said holder during one stop of said holder, means for injecting a stream of water into the said holder during the next succeeding stop of the same, and a shearing knife operatively mounted between said brush and said washing means.

19. In combination, a fish spreader and positioner, a grader, fish inverting means, means for receiving the inverted fish and positioning the same uniformly upon their sides, feeding devices for the positioned fish, a fish holder, means for transferring the individual fish from the feeding devices to said holder at fixed intervals, mechanism for revolving said holder and the fish therein about a given center, devices for beheading and cleaning the fish located at fixed intervals in the path of travel of said holder, means for discharging the cleaned fish from the holder, and means for operating the several parts and devices in coördinate relation with each other.

20. In a fish cleaning machine the combination with fish positioning and grading devices and fish beheading and cleaning devices, of a water bath operatively mounted to receive the fish from the grading devices and invert the same, and means operatively mounted to receive the inverted fish from the water bath, turn them uniformly upon their sides and deliver the same to said beheading and cleaning devices.

21. A fish cleaning machine of the kind defined by claim 20 in which the bath is supplied with running water moving from the grading devices toward and into operative communication with the means for positioning the fish upon their sides.

22. A fish cleaning machine of the kind defined by claim 20 in which the means for turning the fish uniformly upon their sides consists of a sharply V shaped trough operatively mounted to communicate with and receive the inverted fish from said bath, the said V shaped trough having one side thereof gradually assuming a horizontal position and communicating with the beheading and cleaning devices.

ALBERT REYNOLDS.